No. 688,950. Patented Dec. 17, 1901.
M. HOLL.
TRAY HOLDER.
(Application filed Apr. 4, 1901.)
(No Model.)
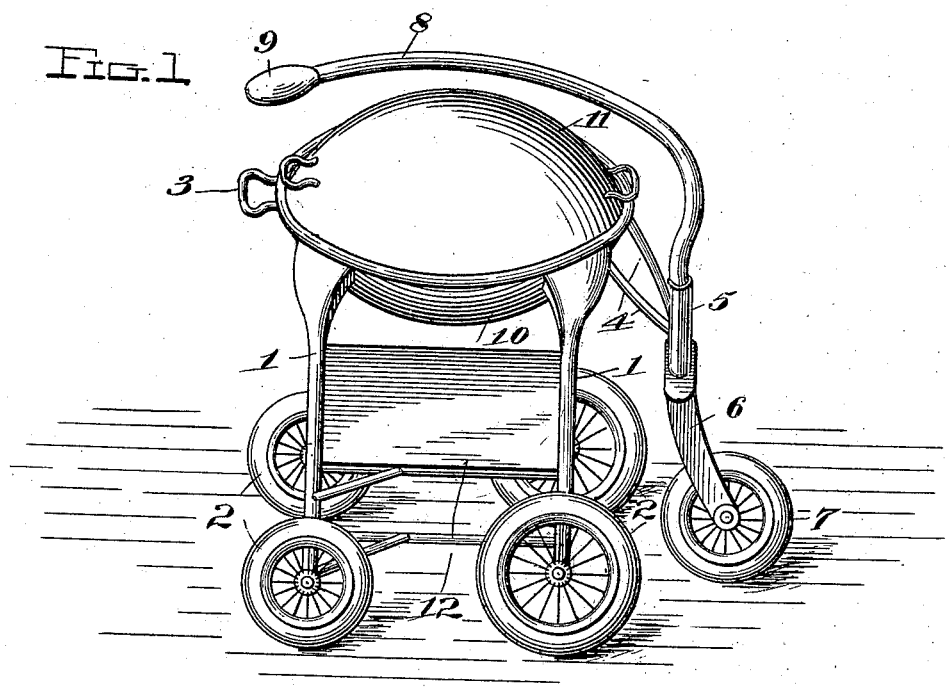
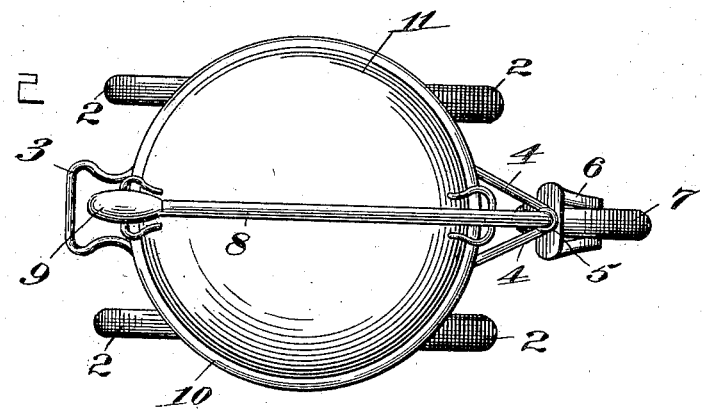
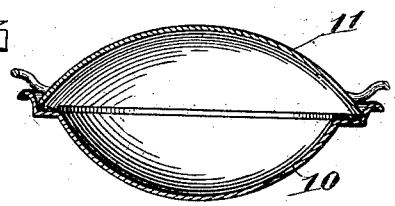
Witnesses
Elmer Leavey
Inventor
Marguerite Holl.
By H. B. Willson & Co.
Attorneys
THE NORRIS PETERS CO., PHOTO-LITHO., WASHINGTON, D. C.

UNITED STATES PATENT OFFICE.

MARGUERITE HOLL, OF BENTON HARBOR, MICHIGAN.

TRAY-HOLDER.

SPECIFICATION forming part of Letters Patent No. 688,950, dated December 17, 1901.

Application filed April 4, 1901. Serial No. 54,386. (No model.)

*To all whom it may concern:*

Be it known that I, MARGUERITE HOLL, a citizen of the United States, residing at Benton Harbor, in the county of Berrien and State of Michigan, have invented certain new and useful Improvements in Tray-Holders; and I do declare the following to be a full, clear, and exact description of the invention, such as will enable others skilled in the art to which it appertains to make and use the same.

This invention relates to tray-holders, and has for its object to provide a wheeled carrier for transporting food to be served from place to place in the dining-rooms of hotels and other public places where meals are served, also for use in hospitals and private dwellings for serving food to patients and invalids.

The device, generally stated, embodies a wheeled frame adapted to support the tray and to be pushed along by a waiter, nurse, or attendant. A receptacle is provided to inclose the tray to keep the food warm while in transit and a shelf arranged upon the frame below said receptacle to hold cold dishes, napkins, &c. Guide mechanism is employed and mounted upon the frame in such manner as to adapt the device to be easily and conveniently handled.

The invention consists in certain novel features of construction, combination, and arrangement of parts, as will be hereinafter more fully described, and particularly pointed out in the appended claims.

In the accompanying drawings, Figure 1 is a perspective view of a tray-holder constructed in accordance with my invention. Fig. 2 is a top plan view of the same, and Fig. 3 is a central vertical section.

In carrying my invention into practice I provide a wheeled carrier or supporting-frame comprising end standards or uprights 1, suitably connected and braced and mounted upon wheels 2, rubber-tired to prevent noise in moving the device from place to place. At the rear portion of the frame is provided a handle 3 for convenience in pushing the device along, and at the front are arms or braces 4, to which is connected a steering-head 5, having mounted therein a forked spindle 6, carrying a rubber-tired guide-wheel 7. To the upper end of the spindle 6 is connected an operating-lever 8, which projects rearwardly and above the top of the frame and is provided at its free end with a handle 9, which is adapted when in its normal position to lie adjacent to the handle 3, so that the waiter, nurse, or attendant may propel the carrier from place to place and at the same time conveniently guide it.

Supported upon the standard 1 is a tray holder or receptacle 10, consisting of a comparatively deep pan or vessel of sufficient size to receive the tray and contents and having a removable lid or cover 11, which may be placed in position to close the holder to keep the food upon the tray warm while being transported from the kitchen or other point of supply to the point where it is to be served. This holder may also be employed as a receptacle for dishes which are to be collected and washed. The lid or cover 11 rests within a depression in the rim of the vessel 10, and said rim is preferably lined with rubber or some other suitable non-resonant or sound-deadening material. A fixed tray or shelf is supported by the frame below the tray-holder 10 and may be used for supporting dishes which do not require to be kept warm—such as greens, bread, pastry, or ice-cream—or towels and napkins.

It will of course be understood that in use the waiter, nurse, or attendant pushes the device from place to place where the food is to be transported or the guests are to be served, the handle 3 being grasped in one hand and the handle of the lever 8 in the other hand, thus enabling the operator to propel the device and guide it at the same time. The device when in use may be rolled across a floor or other surface easily and noiselessly and is of advantage in providing means whereby the food to be served may be kept warm and served with celerity.

From the foregoing description, taken in connection with the accompanying drawings, the construction, mode of operation, and advantages of the invention will be readily understood without a further extended description.

Changes in the form, proportion, and the minor details of construction may be made within the scope of the invention without departing from the spirit or sacrificing any of the advantages thereof.

Having thus fully described my invention, what I claim as new, and desire to secure by Letters Patent, is—

1. A tray-holder comprising in its construction a wheeled supporting-frame, wheels for propelling and guiding the frame, and a receptacle mounted upon the frame for the reception of a tray, substantially as described.

2. A tray-holder comprising a wheeled frame, a propelling-handle connected to the rear portion of the frame, a steering-wheel at the front portion of the frame, and an operating-lever projecting rearwardly and having a handle located in close proximity to the said propelling-handle, substantially as described.

3. A tray-holder comprising a wheeled supporting-frame provided at the rear with a propelling-handle, a closed tray-receptacle carried by the frame, a shelf upon the frame below said receptacle, a guide-wheel at the front of the frame, and a lever connected to the guide-wheel and projecting rearwardly above said receptacle and having at its free end a handle located in close proximity to the said propelling-handle, substantially as described.

In testimony whereof I have hereunto set my hand in presence of two subscribing witnesses.

MARGUERITE HOLL.

Witnesses:
JOSEPH TENNANT,
FRED B. COLLINS.